United States Patent [19]
Lo

[11] Patent Number: 5,122,928
[45] Date of Patent: Jun. 16, 1992

[54] MONITOR HOUSING

[76] Inventor: Kun-Nan Lo, No. 33, Hsiang-Ho Rd., Lin-Lin Tsun, Tan-Tzu Hsiang, Taichung Hsien, Taiwan

[21] Appl. No.: 715,981

[22] Filed: Jun. 17, 1991

[51] Int. Cl.⁵ .............................................. H05K 1/14
[52] U.S. Cl. ................................... 361/395; 361/331; 361/380; 361/399; 312/7.2; 358/254; 358/248
[58] Field of Search .............. 361/380, 392, 393, 394, 361/395, 399, 331, 415, 429; 455/347; 358/254, 248, 249; 312/7.2; 340/717

[56] References Cited
U.S. PATENT DOCUMENTS

| | | | |
|---|---|---|---|
| 2,793,091 | 5/1957 | Christians | 312/7.2 |
| 2,805,411 | 9/1957 | Rose | 312/7.2 |
| 4,006,300 | 2/1977 | Boldt et al. | 312/7.2 |
| 4,643,493 | 2/1987 | Sides, Sr. et al. | 312/7.2 |
| 4,657,316 | 4/1987 | Hardt et al. | 312/7.2 |
| 5,033,802 | 7/1991 | Fairbanks | 312/7.2 |

Primary Examiner—Leo P. Picard
Assistant Examiner—Young S. Whang
Attorney, Agent, or Firm—Nixon & Vanderhye

[57] ABSTRACT

A housing includes a pan shaped front cover having a front open wall with a rectangular peripheral flange formed around the front wall and a pan shaped rear cover having a closed end and an open end to connect with the rectangular flange. A plurality of engaging members are formed on the peripheral flange. A pair of elongated plates spaced parallel and apart from one another having a length equal to the length between the front and rear cover. Each of the elongated plates have a front end with an engaging member and a rear end with another engaging member. An elongated recessed groove facing into the interior of the housing extends from the front end to the rear end. An auxiliary plate extends inclinedly from the intermediate of the elongated plate toward the front cover. The free end of the auxiliary plate has an engaging member. The rear ends of the elongated plates are connected by a transverse plate.

3 Claims, 3 Drawing Sheets

MONITOR HOUSING

BACKGROUND OF THE INVENTION

1. Field of Invention

The invention relates to a housing, more particularly to a monitor housing which can be assembled and disassembled easily while at the same time avoid damaging any equipment provided therein.

2. Description of the Related Art

FIG. 1 shows a monitor housing of prior art model. Accordingly, it includes a front wall (1), a rear wall (not indicated) and a side wall (2) to interconnect said front and rear walls. The side wall (2) has an opening at the bottom portion thereof. A circuit board (4a) having a plurality of subelectronic assemblies mounted thereon is provided on a base plate (2a) which is in turn inserted into the open bottom of the side wall (2). The circuit board is screwed to the base plate and which is fixed on a support member (10). The support member (10) is adjustably mounted on a stand (3). The base plate (2a) further has a vertical portion (4b) which is screwed to the front portion (1). A display unit (5) is also mounted on the front wall (1) so that the overall weight of the display unit, the side wall and rear wall is concentrated on the vertical portion (4b), which in the long run can weaken the erectness of the vertical portion. Moreover, in case any components on the circuit board need to be replaced, the circuit board (4a) can not be easily disassembled consequently causing delay in the operations.

SUMMARY OF THE INVENTION

Therefore the main object of the present invention is to provide a monitor housing which can be easily disassembled and reassembled without damaging the housing in the event that a component of the circuit board provided therein need be replaced.

Another object of the present invention is to provide a monitor housing which is more durable in comparison to the prior art model.

Accordingly, a monitor housing of the present invention includes a pan shaped front cover having a flat open wall to receive a displaying unit therein and a peripheral flange formed around said flat open wall, a pan shaped rear cover having a closed wall and a side wall integrally formed with said closed wall. The side wall has a free end that is connected with the peripheral flange of the front cover. The peripheral flange has at least two pairs of engaging members, one pair opposite the other and adjacent to the flat open wall. A pair of elongated plates spaced parallel and apart from one another and have a length substantially equal to the length between the flat open wall of the front cover and the closed wall of the rear cover. Each of said elongated plates have a front end with a first engaging member, a rear end and an intermediate portion between the front and rear ends. Each of the elongated plate have an elongated recessed groove facing inwardly of the housing extends from the front end towards the rear end of the elongated plate. A circuit board is inserted into the elongated recessed grooves. An auxiliary plate extends in an inclined manner from the intermediate portion of the elongated plate towards the flat open wall to a position vertically aligned with the front end of the elongated plate. A second engaging member is formed at the free end of the auxiliary plate. The rear ends of the pair of elongated plates are connected by a transverse plate. The transverse plate has a mounting means. The closed wall of the rear cover is attached to the mounting means of the transverse plate wherein the pair of elongated plates lie within the housing. The first and second engaging members of the elongated plates engage with the pair of engaging members of the peripheral flange of the front cover.

BRIEF DESCRIPTION OF THE DRAWINGS

Other features and advantages of the present invention will become more apparent in the following detailed description, including the drawings, all of which show a non limiting forms of the invention, and of which.

DETAILED DESCRIPTION OF THE PREFERRED EMBODIMENT

Figure 1:
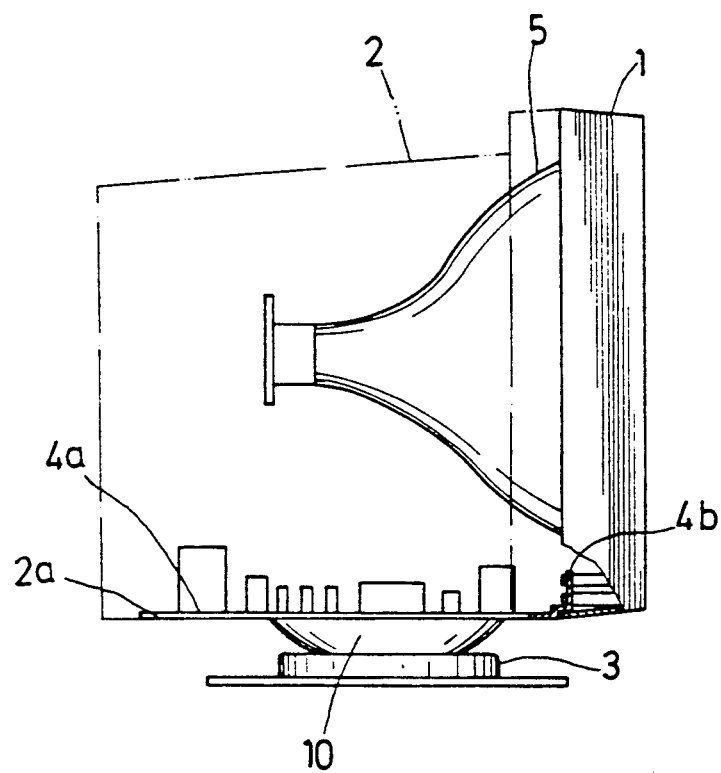
FIG. 1 is side view of a monitor housing of prior art model.
Figure 2:
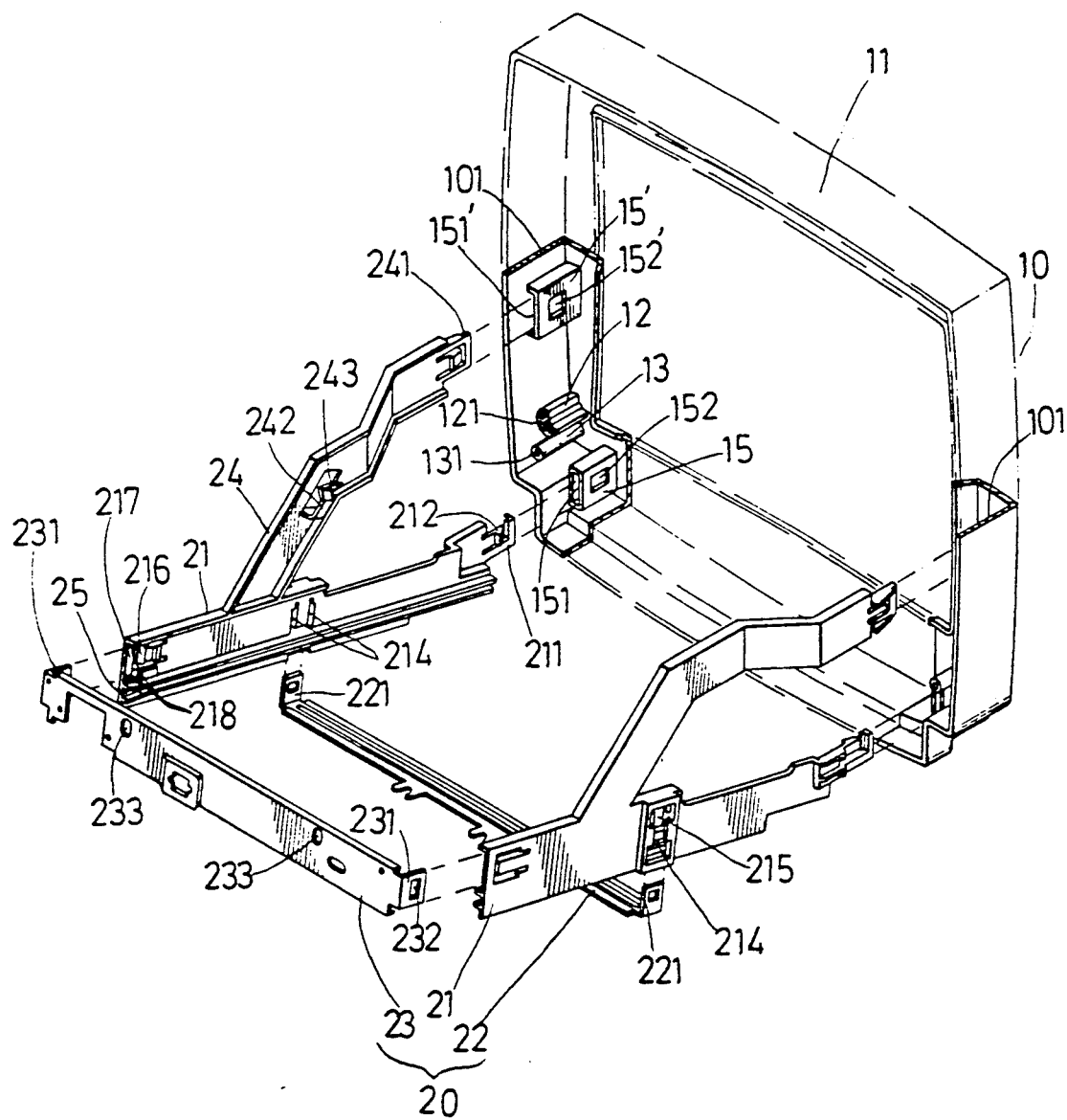
FIG. 2 is an exploded view of a monitor housing of the present invention.
Figure 4:
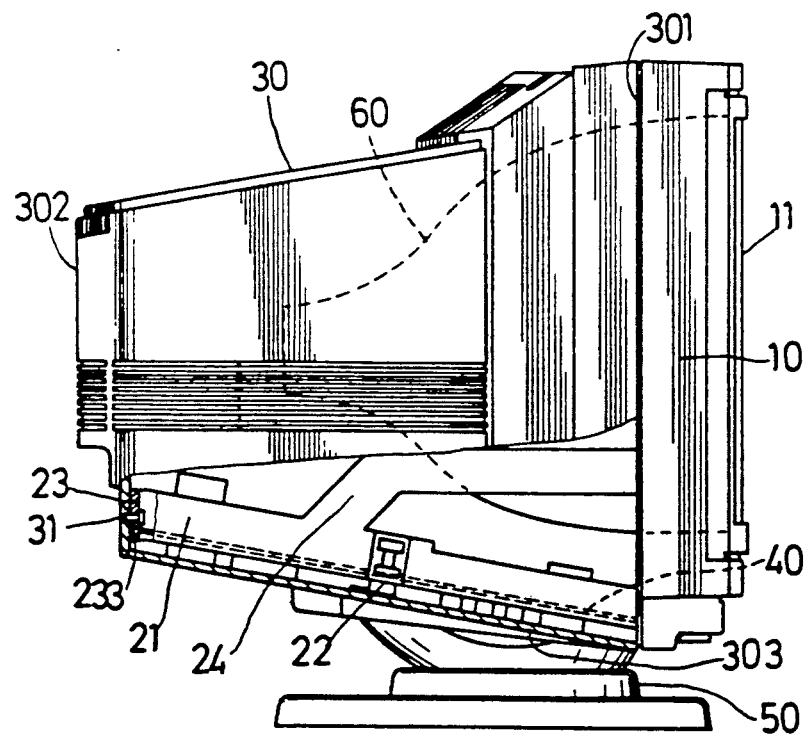
FIG. 4 is a side view of a monitor housing of the present invention.

Referring to FIGS. 2 and 4, an exploded view of a monitor housing of the present invention includes a pan shaped front cover (10) having a rectangular flat wall (11) with an opening to receive a display unit (60) therein and a rectangular peripheral flange (101) formed around the flat wall (11) and a pan shaped rear cover (30) having a closed wall (302) and an open end (301) to be connected to said peripheral flange (101).

The flat wall (11) of the front cover (10) has a plurality of solid protrusions (12,13) with threaded bores (121,131) so that the display unit (60) can be mounted in the opening of the flat wall (11) and screwed to these solid protrusion (12,13).

The rectangular flange (101) has two pairs of engaging members (15,15'), one pair on each side of the same and adjacent to the flat wall (11) of the front cover (10). Each engaging member (15,15') is spaced apart from one another and has a first opening (151') facing towards the rear and a second opening (152) facing towards the interior of the housing.

A pair of elongated plates (21) spaced parallel and apart from one another have a length substantially equal to the length between the flat wall (11) of the front cover (10) and the closed wall (302) of the rear cover (30). Each of the elongated plates have a front end (212) with a first engaging member (211), a rear end (217) with a engaging member (216) and an intermediate portion between the front and rear ends. The intermediate portion of the elongated plate (21) has a guiding path (214) and an engaging member (215) formed above the guiding path (214).

Figure 3:
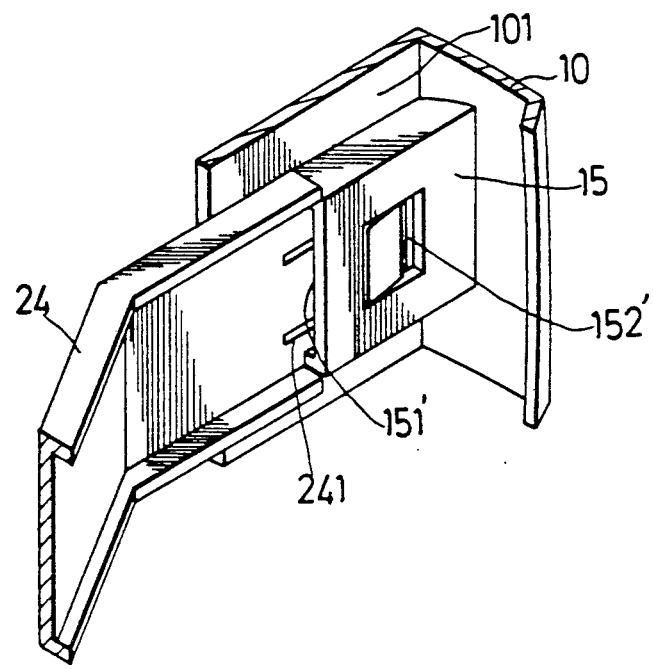
FIG. 3 is a partially enlarged view of an engaging member of the housing according to the present invention.

An auxiliary plate (24) extends in an inclined manner from the intermediate portion of the elongated plate towards the front cover (10) to a position substantially and vertically aligned with the front end of the elongated plate (21). An engaging member (241) is formed at the free end of the auxiliary plate (24). The engaging method used in this preferred embodiment is conventional in that it uses a wedge-like protrusion inserted into a tube with a side opening, wherein the wedge-like protrusion snaps into the side opening and thereby locks the two elements together as illustrated in FIG. 3.

Though the present invention use such method for the engaging purpose, the distinct feature does not lie here. Thus a detailed description of such will be omitted here.

The auxiliary plate (24) further has a guiding means (242) including a hook (243) adapted to receive a plurality of wires in order to keep them in proper arrangement.

Each of the elongated plates has an elongated recessed groove (25) extending from the front end to the rear end. A circuit board (40) with a plurality of subelectronic assemblies is inserted into the recessed grooves (25) of the elongated plates (21).

A transverse plate (23) has two free ends with two projections (231) perpendicularly extend therefrom. Each of the projections have an opening (232) therethrough so that when the rear ends of the elongated plates (10) are connected to the former, the engaging members (216) of the latter engage one another, as explained above. It is important to note that the transverse plate (23) has a pair of mounting holes (233).

The closed wall (302) of the rear cover (30) has two engaging rods (31) extending frontwardly into the housing. This engaging rods (31) extend into the mounting holes (233) of the transverse plate (23). The engaging members of the auxiliary plate and the elongated plates engage with the pairs of engaging members on the rectangular peripheral flange (101). Thus completes the assembling process.

In order to strengthen the rigidity of the elongated plates (21), a reinforcing rod (22) with vertical stud (221) is inserted into the guiding path (214) of the intermediate portions of the same wherein the reinforcing rod connects the elongated plates in the same manner. The bottom (303) of the rear cover is then screwed to a support which in turn is adjustably attached to a base (50), as illustrated in FIG. 4.

As explained in above, it is obvious that the monitor housing of the present invention is more durable in comparison with the prior art model, and the overall weight of a display unit provided in the opening of the front wall is equally distributed on the pair of elongated plates. Thus the present housing does not have the drawback of the prior art model.

In case any of the components on the circuit board (40) need to be replaced, the circuit board can easily slide out of the recessed grooves of the elongated plate (21), thus making the whole housing much more convenient for repair.

With the invention thus explained, it is obvious to those skilled in the art that various modifications and variations can be made without departing from the scope and spirit of the present invention. It is therefore intended that this invention be limited as in the appended claims only.

I claim:

1. A monitor housing including a pan shaped front cover having a flat wall with an opening to receive a displaying unit therein, said flat wall having a peripheral flange around the same and a pan shaped rear cover having a flat closed wall and a side wall, said side wall being integrally formed with said flat closed wall and connected to said peripheral flange, a circuit board being disposed in said housing;

characterized in that said peripheral flange of said front cover has at least two pairs of engaging members, one pair opposite the other and each of said pairs being adjacent to said flat open wall, each of said engaging members in said pairs of engaging members being spaced apart from one another on said peripheral flange;

a pair of elongated plates are spaced parallel and apart from one another and have a length substantially equal to the length between said flat open wall of said front cover and said flat closed wall of said rear cover, each of said elongated plates have a front end with a first engaging member, a rear end and an intermediate portion between said front and rear ends, an elongated recessed groove facing inwardly of the housing extends from said front end to said rear end, said elongated plate further having an auxiliary plate extending inclinedly from said intermediate portion of said elongated plate toward said flat open wall of said front cover to a position substantially and vertically aligned with said front end of said elongated plate, said auxiliary plate having a second engaging member formed at its free end thereof;

said circuit board is inserted into said elongated recessed groove of said elongated plates;

a transverse plate has two ends connecting said rear ends of said pair of elongated plates, said transverse plate further having a device to attach on said flat closed wall of said rear cover;

said pair of elongated plates are inside of said housing between said flat open wall of said front cover and said flat closed wall of said rear cover, said second engaging members and said first engaging members respectively engaging with said pair of engaging members on said peripheral flange of said front cover.

2. A monitor housing as claimed in claim 1, characterized in that said device is a pair of mounting holes each respectively adjacent to said two ends of said transverse plate, said closed wall of said rear cover further has a pair of engaging hooks extending into said housing which are to be inserted into said pair of mounting holes.

3. A monitor housing as claimed in claim 1, characterized in that said auxiliary plate has a peg member at its intermediate portion thereof.

* * * * *